INVENTOR
GEORGE. B. GREENE
BY Rankin A. Milliken
ATTY

United States Patent Office 3,511,352
Patented May 12, 1970

3,511,352
AUTOMATIC BAR TYPEWRITERS AND THE THE LIKE HAVING ROLL-CAM TYPE DRIVE MECHANISMS
George B. Greene, 2501 Anniversary Lane, Newport Beach, Calif. 92660
Continuation of application Ser. No. 693,250, Dec. 26, 1967. This application Nov. 25, 1968, Ser. No. 778,481
Int. Cl. B41j 23/12
U.S. Cl. 197—20   13 Claims

ABSTRACT OF THE DISCLOSURE

An automatic bar typewriter in which the timing mechanism is arranged to operate the reader and translator during automatic operation at a rate or rates such that repeated impressions of the same character are substantially equal in print quality. A preferred form of type bar drive mechanism is one in which the cam is capable of return motion while the type bar is still moving toward its printing position.

CROSS-REFERENCE TO RELATED APPLICATION

This is a continuation of copending application Ser. No. 693,250, filed Dec. 26, 1967, now abandoned.

FIELD OF THE INVENTION

This invention relates to improvements in automatic typewriters of the kind which comprise a set of type bars (herein called "automatic bar typewriters"), and more particularly to modifications of the existing mechanisms of such typewriters whereby they may be reliably operated at increased speed.

DESCRIPTION OF THE PRIOR ART

An early automatic bar typewriter is shown in U.S. Pat. No. 2,247,275, issued to Arthur H. Buckley on June 24, 1941, and hereinafter referred to as "Buckley."

The advent of computer technology and the ever-widening application of automatic data processing have made the limited speed of operation of the earlier automatic bar typewriters an ever more acute problem. It has long been recognized that this speed limitation manifests itself in the form of erratic immediate reprinting of the same character by such automatic typewriters when the operating speed thereof is increased above certain maximum values which depend upon the structure and dynamics of the particular automatic typewriter in question. It has also been recognized in the art that such erratic immediate reprinting operation results in large part from the failure of the type bars and their assoicated drive mechanisms (taken together, "print mechanisms") to come quickly to rest after imprinting a character; i.e., from the fact that these elements constitute systems which have a finite damping period, in some cases more than half as long as the type bar flight period.

However, despite the major economic advantages to be gained from substantially increasing the speed of automatic bar typewriters, the complex dynamic properties of the print mechanisms of these devices have defied the efforts of those having a high order of skill in the art to achieve major improvements in their speed of operation.

Thus, the efforts of those skilled in the art have been directed to the design of data processing systems employing automatic bar typewriters in which the long damping period of the type bars and their drive mechanisms has been recognized as a limiting factor, and auxiliary control apparatus is provided to limit the speed of the reader to a rate acceptable by the typewriter. An example of such a system can be found in U.S. Pat. No. 2,995,231 to von Kummer et al.

SUMMARY OF THE INVENTION

It is therefore an object of my invention to provide improved automatic bar typewriters capable of operating at speeds in advance of any hitherto attained without the employement of complex and costly auxiliary control apparatus.

To accomplish this object in accordance with the teachings of my invention, a preferred form of type bar drive mechanism is employed in which the drive cam is capable of return motion while the type bar is still moving toward its printing position. Also, according to my invention, the timing mechanisms of many automatic typewriters may be modified in simple and inexpensive ways to operate the readers and translators thereof at certain favorable rates or ranges of rates which I have discovered. It is characteristic of these favorable rates or ranges of rates that the second or further immediate reactuation of a particular type bar or hammer at such rates results in an impression which is neither substantially darker nor substantially lighter than the first impression made by that same hammer, despite the fact that this reactuation takes place well before the complete damping of the hammer, or in some cases even before its first impact upon the head rest.

Additonal objects of my invention will in part be obvious and will in part appear hereinafter.

My invention, accordingly, comprises the features of construction, combinations of elements, and arrangements of parts which will be exemplified in the constructions hereinafter set forth and the scope of my invention will be indicated in the appended claims.

BRIEF DESCRIPTION OF THE DRAWINGS

For a fuller understanding of the nature and objects of my invention, reference should be had to the following detailed description, taken in connection with the accompanying drawings, in which.

DESCRIPTION OF PREFERRED EMBODIMENTS

Figure 1:
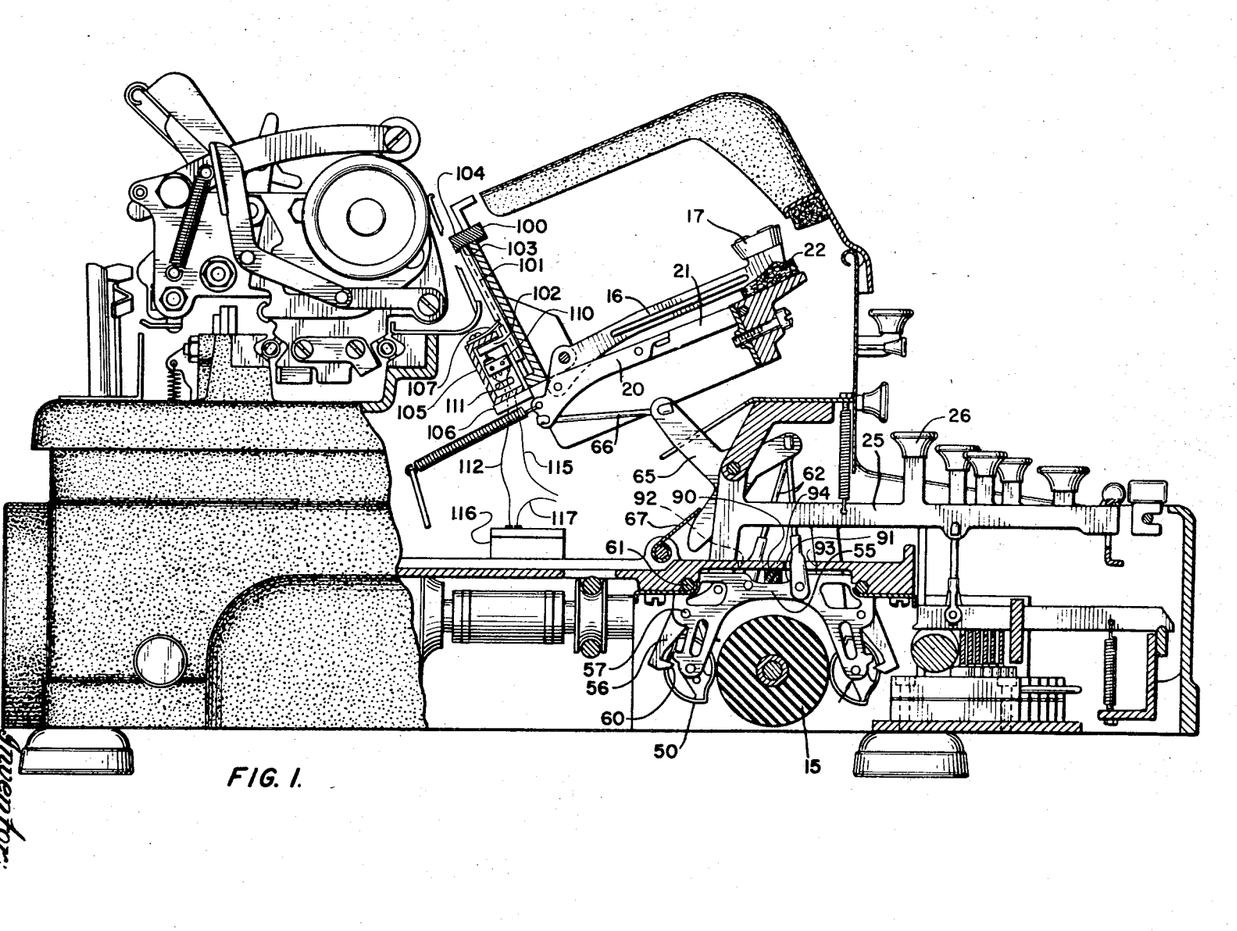
FIG. 1 represents an improved automatic bar typewriter embodying certain features of my invention.
Figure 7:
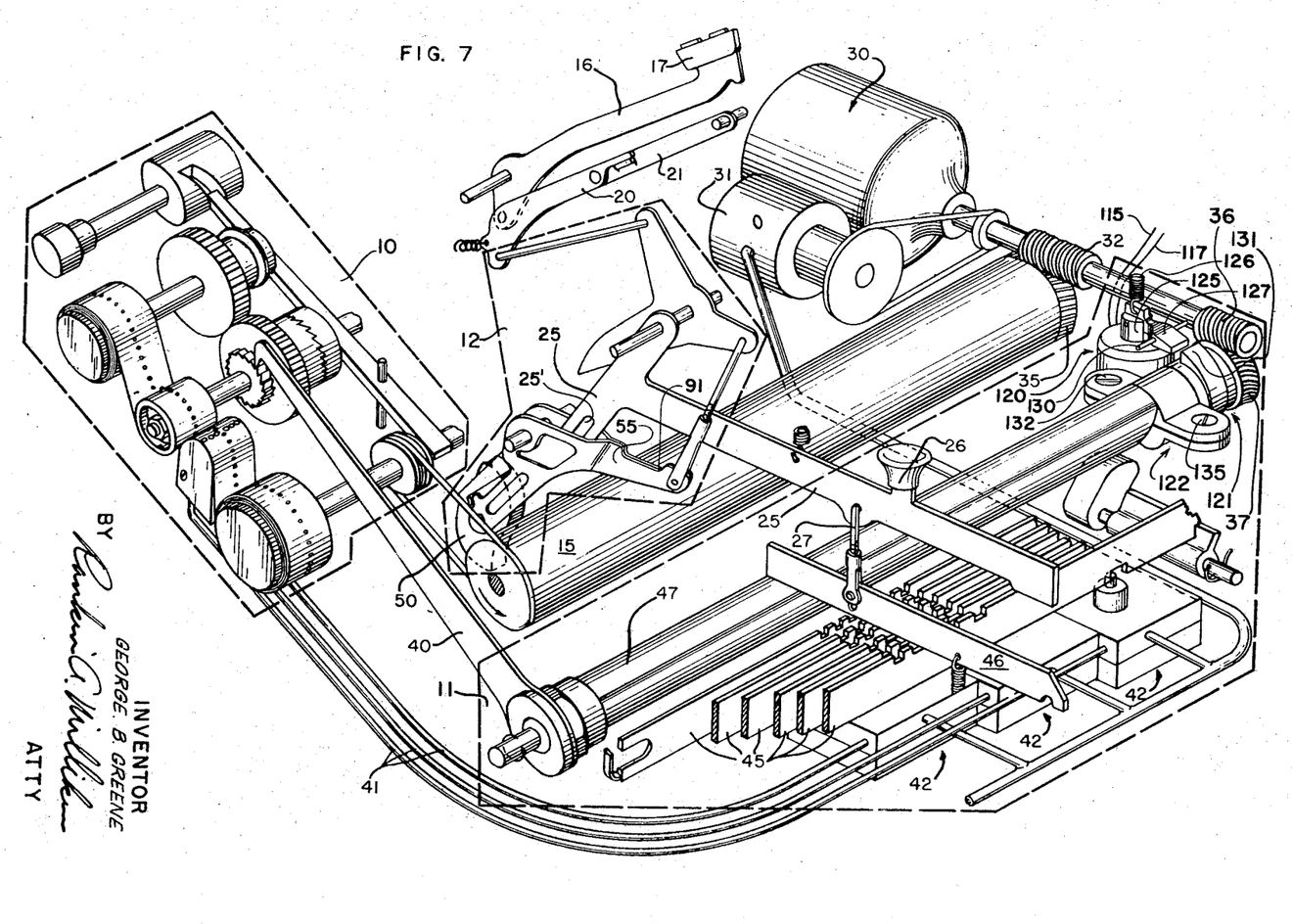
FIG. 7 is a diagrammatic perspective view of the automatic control mechanism of an improved automatic bar typewriter embodying certain features of my invention.

Referring first to the automatic bar typewriter mechanism illustrated in FIGS. 1 and 7 which is based on the mechanism of the Buckley patent, it may be seen that, in addition to the known elements of a motorized typewriter, such automatic typewriters comprise a reader (dashed outline 10, FIG. 7), a translator and key bar actuator, sometimes called simply "translator," (dashed outline 11, FIG. 7), a plurality of type bar drive mechanisms (dashed outline 12, FIG. 7), and a power roll or drive roll 15 adapted to supply type bar actuating power to type bar drive mechanism 12. Each type bar drive mechanism 12 is interconnected with a corresponding type bar 16, and adapted to actuate its associated type bar 16 to strike its type head 17 against a record medium disposed upon a platen (not shown). In the device of the Buckley patent the interconnection between each type bar drive mechanism and its corresponding type bar 16 includes a toggle, comprising back line 20 and front link 21. This type bar arrangement, including a type bar 16, back link 20, and front link 21, and the associated pivot means, both fixed and free, is hereinafter called a "toggle hammer mechanism," or simply "toggle hammer."

Figure 8:
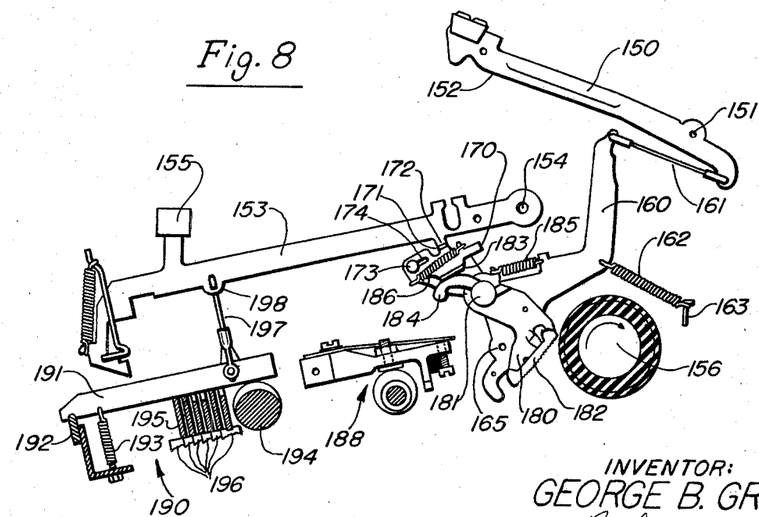
FIG. 8 is a partial schematic representation of an automatic bar typewriter employing a preferred form of type bar drive mechanism.
Figure 9:
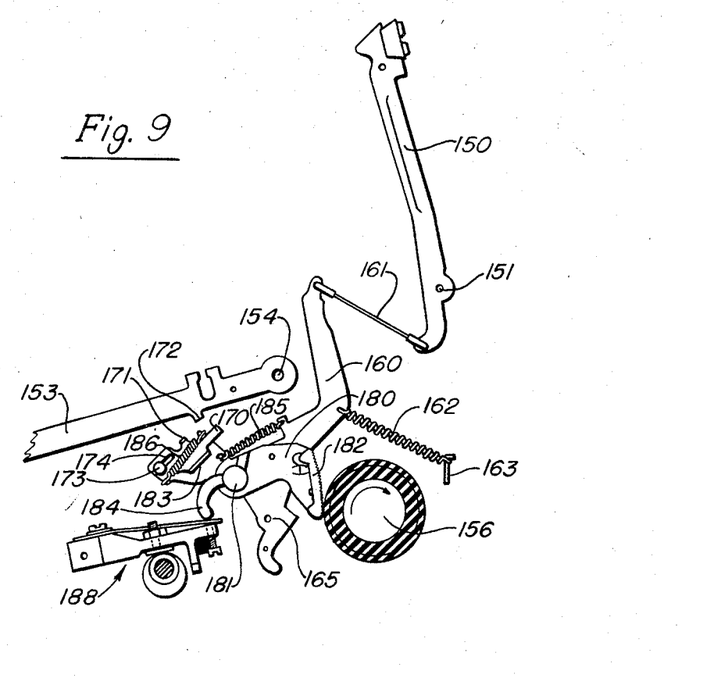
FIG. 9 is a schematic representation of the type bar drive mechanism of FIG. 8 during its print stroke.

According to one aspect of my invention, it is desirable to replace toggle hammers with hammers such as that shown in FIGS. 8 and 9 herein, and in FIG. 1 of U.S. Pat. No. 3,106,337, issued to D. W. Bernard on Oct. 8, 1963, i.e., hammers which have neither a back link nor a front link, but rather are directly coupled to the output link of the type bar drive mechanism. Such hammers will hereinafter be called "plain hammers," or "free hammers."

A head rest 22 is provided in the form of an elongated resilient member upon which type heads 17 rest when completely damped. As may best be seen in FIG. 7, each key lever 25 (one only shown for clearness of illustration) may be equipped with a manually actuable press button or cap 26, though it is to be clearly understood that the present invention is not limited to machines having a keyboard; but applies as well to devices having a partial keyboard or none. Key levers 25 are also provided with links 27 whereby they may be actuated by the translator. There is also provided an electric motor 30 which drives a pneumatic pump adapted to supply pneumatic power to translator 11. The output shaft of motor 30 also drives worm 32, which meshes with pinion 35 to impart power to drive roll 15, and also drives worm 36, which meshes with pinion 37 to provide power to reader 10 and translator 11 via cycle clutch 121 described hereinafter. Pawl 40, which is driven by means comprising part of translator 11, serves, along with its associated ratchet wheel, and other parts shown within dashed outline 10 of FIG. 7, to advance the perforated tape which is the data input medium "read" by reader 10. Thus, it may be seen that worms 32 and 36, pinions 35 and 37, pawl 40 and cycle clutch 121, inter alia, serve to establish the relative timing of the cycles of operation of the various major sections of the automatic bar typewriter shown in FIGS. 1 and 7, and when the expression "timing mechanism" is used hereinafter, it is contemplated that the term will embrace these parts.

As taught in detail in the Buckley patent, information read by reader 10 is pneumatically conveyed via conduits 41 to pneumatic actions 42 in translator 11, which pneumatic actions serve to control the positions of permutation bars 45 in accordance with the information received by way of conduits 41. In the well-known manner, each possible permutation of positions of permutation bars 45 corresponds to a unique alignment of the slots in the top of permutation bars 45 such that only one seeker 46, when allowed to drop by elongated cam 47, can drop sufficiently far to actuate or trigger its associated type bar drive mechanism 12 by downwardly deflecting its associated key bar 25 via its associated link 27. Further details of the mechanisms shown in FIGS. 1 and 7 will be found in the Buckley patent, from which those figures are derived.

It is to be understood, however, that the present invention is in no sense limited in its application to automatic bar typewriters following the teachings of Buckley. To the contrary, the teachings of certain aspects of my present invention have been experimentally proved out by incorporating them in a manually operated IBM Model C electric typewriter which I adapted for automatic operation in accordance with the principles of my inventions disclosed and claimed in my U.S. Pat. No. 3,342,297, issued Sept. 19, 1967 (hereinafter sometimes referred to as "my '297 patent"), and which I also equipped with the operating speed increasing inventions of my U.S. Pat. No. 3,342,296, issued Sept. 19, 1967 (hereinafter sometimes referred to as "my '296 patent"), which modified typewriter I call the "Nova" typewriter.

As described in much greater detail in the Buckley patent, type drive mechanism 12 may be seen in FIGS. 1 and 7 to operate generally as follows. S-cam 50 is journalled in the lower extremity of bell-crank 55. When a fork 25' at the end of the downwardly projecting portion of key lever 25 shifts hook 56, which is pivoted to bell-crank 55 at 57, an ear 60 on S-cam 50 is escaped, and cam 50 is rotated by a spring arrangement (not shown) so that it engages drive roll 15. (Said spring arrangement differs considerably from the positive roll-cam engaging arrangement of the IBM Model C typewriter, and it is to be understood that the trajectories represented herein are derived, except as noted, from experience with the Model C typewriter.) The engagement between cam 50 and drive roll 15 causes cam 50 to rotate and, due to the increasing radius of cam 50, a bell-crank 55 is rocked in a clockwise direction about pivot 61, thereby exerting a downward pull on link 62. Link 62 in turn rocks bell-crank 65 in a clockwise direction, causing link 66 to open toggles 20, 21 and stroke type bar 16.

As seen in FIG. 7, a solenoid 120 and cycle clutch 121 are provided which can be used for the same purpose as solenoid 103 and cycle clutch 102 of my '297 patent.

When solenoid 120 is energized by leads 115 and 117, plunger 125 is drawn into the coil against the action of spring 126, thus pivoting pawl 127 about pivot 130 and withdrawing pawl 127 from engagement with dog or detent 131 or the sleeve of spring clutch 121. At the termination of the energizing impulse of DC voltage or spacing signal SS solenoid 120 will be de-energized and spring 126 will withdraw plunger 125, thus resiliently pressing pawl 127 against the surface of the sleeve of clutch 121.

Clutch 121 is a spring clutch or cycle clutch of the kind well known in the data processing arts and shown, for example, in FIG. 21 of my '297 patent. The input member of clutch 121 (to which neither end of the clutch spring is fastened) is fixed to a stub shaft on which pinion 37 is also fixed for joint rotation therewith. Dog or detent 131 is integral with the sleeve of clutch 121. The output member of clutch 121 (to which one end of the clutch spring is affixed) is fixed to the input shaft of clamp 122.

Clamp 122 is fixed against rotation with respect to the output member of clutch 121. Clamp 122 is partially split in the usual manner, this split intersecting a bore in the right-hand end of the clamp as seen in FIG. 7. Said bore receives one end of the shaft of cam 47. The two ears of clamp 122 are provided with screw means 132 and 135 by means of which clamp 122 can be made to engage the shaft of cam 47 and hold cam 47 in any desired angular relationship to the output member of clutch 121 about their common axis. Said bore within clamp 122 may be provided with gripping teeth or other projections in the well-known manner, and screw means 132 and 135 may be differentially threaded in the well-known manner to assure non-slipping engagement between clamp 122 and the shaft of cam 47.

Means for energizing solenoid 120 in response to the usual manual start and reader restart controls will be provided by those having ordinary skill in the art.

An example of a preferred form of type bar drive mechanism for use in carrying out my invention is shown in FIGS. 8 and 9. The type bar drive mechanism of this example is the type bar drive mechanism of the well known IBM Model C manually operated electric bar typewriter.

Though the superior properties of this type bar drive mechanism for automatic operation at advanced speeds were not recognized prior to my invention, the type bar drive mechanism itself is well known to those having ordinary skill in the electric typewriter art, and was well known at the time of my invention, and thus this mechanism will be described herein only in sufficient detail to aid in understanding my invention.

Referring now to FIGS. 8 and 9, it may be seen that, in the single print mechanism illustrated therein, type bar 150 is pivoted at fulcrum 151. A head rest 152 for all of the type bars 150 is provided in the well known manner. As may be understood from inspection of any IBM Model C typewriter, the several type bars in the type basket vary considerably in shape, bar 150 of FIGS. 8 and 9 having been selected merely for illustration.

A key lever 153 pivoted at fulcrum 154, is provided for actuation of the type bar drive mechanism, as by means of a manually depressible key 155. A motor driven power roll 156 is provided in the well known manner.

A separate actuating bell-crank 160 is coupled to each of said type bars 150 by means of a corresponding link 161. Each actuating bell-crank 160 is provided with a spring 162, fastened at its opposite end to a typewriter frame member 163, by means of which each actuating bell-crank 160 is biased to rotate about fulcrum 165 toward the position of rest illustrated in FIG. 8.

A trip lever 170, having a lug 171 at its upper edge which is constructed and arranged to cooperate with a lug 172 on the lower edge of key lever 153, is pivotably and slidably mounted on actuating bell-crank 160 by means of a rivet 173 which passes through a slot 174 in the trip lever.

A drive bell-crank 180 is pivotably mounted on actuating bell-crank 160 by means of a pivot 181. A cam 182 is mounted at the outer end of the right-hand arm of drive bell-crank 180 for coaction with power roll 156. A lug 183 on the lower edge of trip lever 170 is arranged to move cam 182 into engagement with power roll 156 by pressure on the left-hand arm 184 of drive bell-crank 180.

Spring 185 is provided to bias drive bell-crank 180 toward its normal position of rest. A spring 186 is provided to bias trip lever 170 toward its rest position.

An adjustable cam knockout finger assembly 188 is provided which contacts the extremity of the left-hand arm 184 of drive bell-crank 180 and thus limits the range of engagement between cam 182 and drive roll 156, and controls the weight of the impression made by type bar 152. Details of the construction and operation of adjustable cam knockout finger assembly 188 will be found in service manuals relating to the IBM Model C typewriter.

An example of an automatic bar typewriter according to my invention may comprise an electric typewriter employing my preferred form of type bar drive mechanism, such as the IBM Model C typewriter, the keylevers of which are operated by a reader and translator of the kind disclosed in my said '297 patent.

In FIG. 8 the reference numeral 190 denotes a translator of the kind disclosed in my said '297 patent. As taught in my said '297 patent, each keylever is associated with a sensing lever 191 which is fulcrumed at a common bar 192. All of the levers 191 (one corresponding to each keylever) are biased downward by a spring 193 into contact with the top of elongated cam 194 which is rotated by the timing mechanism of the typewriter to control the operation of the translator in the well known manner. A plurality of permutation bars 195 are selectively positioned by the tongues 196 of a set of fluidic pulsators to successively select the type bars to be actuated in accordance with information received from a perforated tape or the like, all as taught in detail in my said '297 patent. Each type bar 152 is linked to its corresponding sensing lever 191 by means of a link 197 cooperating with a suitable opening in an ear 198 which is integral with the lower edge of the type bar.

My invention is not limited to the employment of the particular reader and translator disclosed in my said '297 patent. For example, one reader and translator arrangement which may be used in carrying out my invention closely resembles the reader and translator of the automatic bar typewriter sold circa 1960 under the trademark Flexowriter, except that the solenoid-latched, heavily spring-loaded interposer bail arm arrangement in the reader is replaced with a helical wire spring cycle clutch of the kind shown and described in my said '297 patent in a manner which will be obvious to those having ordinary skill in the automatic bar typewriter art once taught my present invention.

The principal reason for the superior properties of the preferred form of type bar drive mechanism shown in FIGS. 8 and 9 in carrying out my invention may be seen from consideration of FIG. 8 which shows the state of operation in which cam 182 is about to be disengaged from power roll 156 when the left-hand arm 184 of drive bell-crank 180 strikes knockout finger assembly 188. It will be evident that cam 182 will be disengaged from power roll 156 while type bar 150 and actuating bell-crank 160 are still moving in their driving direction. The continued driving motion of the actuating bell-crank 160, along with the restoring force of spring 185, will cause drive bell crank 180 to be rapidly reset to its rest position with respect to actuating bell-crank 160, from which position it is capable of redriving the returning or rebounding type bar in such manner as to satisfactorily reprint the same character over a relatively wide range of deflections of the type head from the head rest, and with relatively uncritical typewriter adjustments.

Figure 2A:
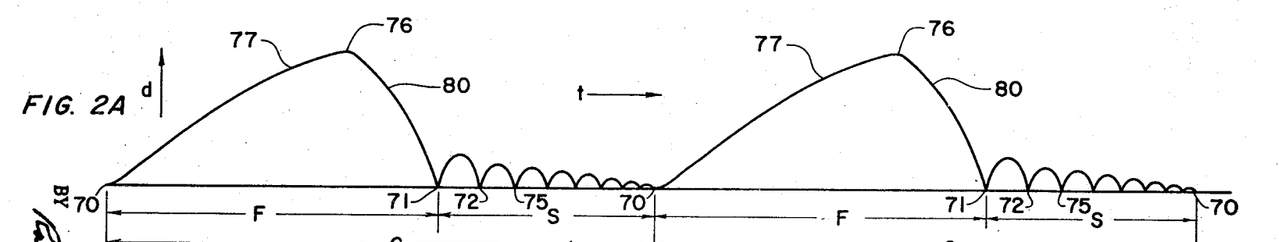
FIG. 2A is a schematic representation of typical flight trajectories of type heads in automatic bar typewriters of the prior art.

FIG. 2A schematically illustrates the relationship between successive print cycles which was hitherto regarded as limiting the speed of operation of single speed automatic bar typewriters. The print cycles shown in FIG. 2A each include a flight phase F and a damping or subsidence phase S. The print cycles C begin and end at points 70, at which the print mechanism is at rest. The initial phase of each print cycle C is a flight phase F, which extends from the point 70 at the start of the print cycle to a point 71 at which the type hammer first rebounds from the head rest. The other phase of the print cycle C is the damping or subsidence phase S which extends from the end point 71 of the flight phase F to the end point 70 of the print cycle C.

Figure 2B:
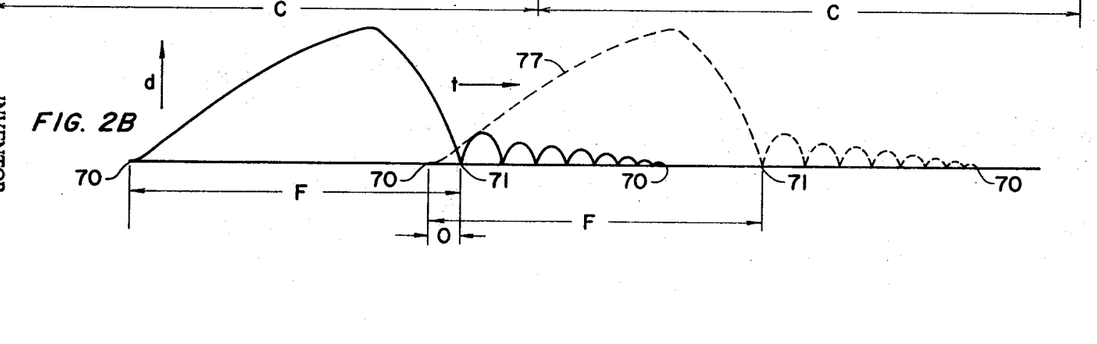
FIG. 2B is a schematic representation of typical flight trajectories of type heads in an improved automatic bar typewriter embodying certain features of my invention.

As will be apparent to those having ordinary skill in the art, FIGS. 2A and 2B are generalized in certain parts not essential to explaining the present invention. On the other hand, such features of the print cycle as the early impacts of the damping type head upon the head rest, 72 and 75, are specifically shown, since they are critical to the carrying out of the present invention. The curve of FIG. 2A represents the trajectory of a typical type bar, i.e., its varying displacement $d$ with time $t$. This and similar curves herein which represent trajectories may themselves be called trajectories. The peaks 76 of the flight time lobes, or F-lobes, represent the impact of the type head upon the platen. The ascending branches or arcs 77 of these lobes, and the descending branches or arcs 80 of these lobes are idealized representations of the performance of actual type bars, it being recognized that such curves may vary not only from typewriter to typewriter, but also from hammer to hammer of the same typewriter.

The multiple lobes ("S-lobes or D-lobes") of the damping phase, or S-phase, of these curves constitute an idealized representation of the subsidence or damping of a typical print mechanism in a typical typewriter.

The print cycles shown in FIG. 2B are idealized in the same sense, and can be recognized by their similarity to the print cycles of FIG. 2A. For the sake of clarity, the reference characters F, S, 70, 71, etc., have been applied to FIG. 2B only where necessary to explain the invention, since the corresponding parts of FIGS. 2A and 2B will be easily identified by those having ordinary skill in the art on comparison.

Referring further to FIG. 2A, it may now be understood that this figure represents two print cycles the first of which follows the second so closely that the hammer corresponding to the second cycle leaves its position of rest at the instant when the hammer corresponding to the first cycle has just come completely to rest at 70. Thus, FIG. 2A may be seen to represent the rate of operation accepted by the prior art as an upper limit for consistently good print quality.

It is immaterial at the rate of operation represented by FIG. 2A whether the successively actuated print mechanisms are the same or different. Thus, both cycles shown in FIG. 2A are shown solid, and FIG. 2A can be taken to represent either printing with two different type bars, or successively printing with the same type bar.

FIG. 2B illustrates the relationship of two successive print cycles in which two different characters are printed in an automatic bar typewriter constructed according to one embodiment of my invention; and, by comparison with FIG. 2A, illustrates the great gains in typewriter operating speed and economy which can be achieved in devices employing my invention. For clarity of illustration, the second print cycle curve shown in FIG. 2B is dashed, to contrast with the representation of the first print cycle, which is rendered in solid lines.

As may be seen by comparison of FIGS. 2A and 2B, it is a characteristic feature of my invention that successive nonrepetitive print cycles in typewriters embodying it are "overlapped" in time. For example, the second print cycle shown in FIG. 2B (dashed) commences at the second point 70 before the first print cycle (solid lines) has ended, while the second print cycle of FIG. 2A commences at the second point 70 only when the first print cycle has ended and the type bar has come to complete rest at the end of its damping period S. Moreover, the overlap between successive print cycles according to the embodiment of my invention illustrated in FIG. 2B is so great that the second print cycle commences before the damping period S of the first print cycle has commenced, as may be seen from the location of the second point 70 of FIG. 2B to the left of the leftmost initial impact point 71. The degree of overlap between successive flight phases F is designated O in FIG. 2B. It is this very great overlap between successive print cycles, made possible by my invention, which makes possible the radical increase in typewriter operating speed attained in certain optimum embodiments of my invention.

The relationship of two successive print cycles C wherein the dispatch point 70 of the second cycle falls within the damping time S of the first cycle is sometimes called "S-overlap" or "damping period overlap" herein; while the relationship wherein the dispatch point 70 of the second cycle falls within the flight time F of the first cycle is sometimes called the "F-overlap" or "flight time overlap" herein.

The gains in automatic typewriter operating speed made possible by my invention result from my discovery that at certain rates of speed or over certain ranges of speed greater than the conventionally accepted upper limit immediately repeated readings of the same tape code during automatic typewriter operation result in a complete set of corresponding impressions all of which are of substantially the same weight.

In different terms, I have discovered that certain singular rates or ranges of rates of operating speed exist at which the print mechanisms of my modified IBM Model C typewriter consistently reprint the same character in successive reader cycles with acceptable print quality, and do so a sufficient number of times for all practical commercial purposes, despite the fact that at these speeds reactuation of at least some of the print mechanisms of the typewriter takes place before the type bars of these mechanisms have fully damped, or settled down.

I call these singular rates or ranges of reader speed "consistent reprinting rates or ranges," or, more precisely, "consistently acceptable reprinting rates or ranges."

THEORY OF OPERATION

In an attempt to explain the existence of these consistent reprinting rates I postulate the existence of corresponding optimum reprinting hammer flight trajectories such as those shown in FIGS. 3A through 3D and FIG. 4, and therein designated T/ORC, or trajectory of optimum reprinting cycle.

Such optimum reprinting hammer flight trajectories may be thought of as rising from corresponding modes of print mechanism reoperation in which the roll cam of the print mechanism being reoperated is reactuated at a time when the not yet fully damped drive mechanism is causing it to recede from the drive roll. According to my hypothesis the reactuation of the roll cam at such a time will ultimately result in a match between the prevailing rebound velocity of the roll cam and the velocity which the rotation of the roll cam by the drive roll tends to impart. Such a match of these two velocities can be expected to generate the minimum amount of undesirable acceleration or deceleration of the print mechanism, which if too great would tend to alter the impact velocity of the type head upon the platen, thus producing just such erratic variations in print quality, i.e., impression weight, as are in fact produced in certain unreliable ranges.

It is to be particularly noted that these modes of reoperation appear to obtain in both the IBM Model C typewriter print mechanisms and also the print mechanisms of the abovesaid Flexowriter automatic bar typewriter which was modified to incorporate certain aspects of my invention. Thus, it can be said that a trajectory of optimum reprinting cycle (T/ORC) of my hypothesis is found or can be made to appear in apparently dissimilar motorized typewriters.

Figure 4:
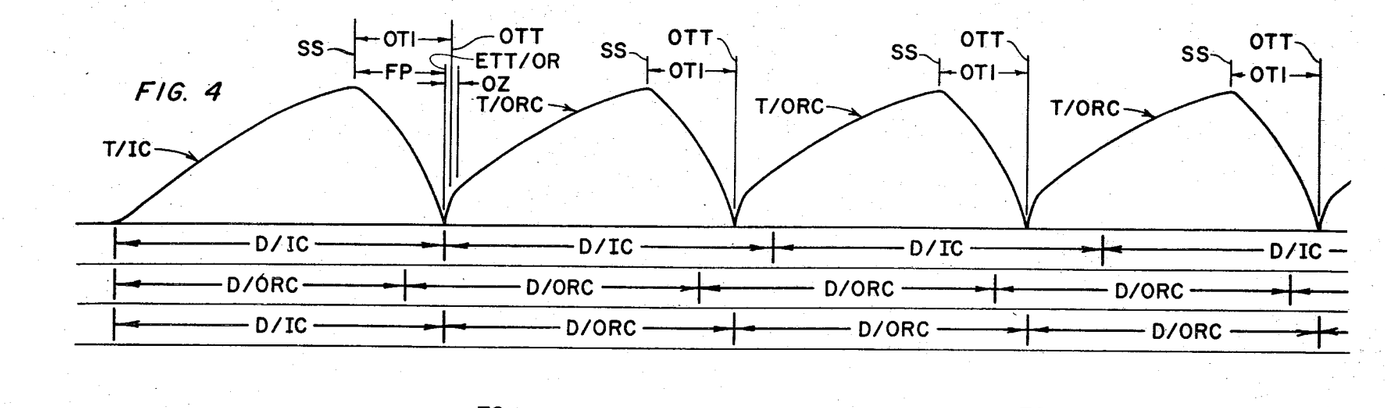
FIG. 4 represents an optimum interrelationship of flight trajectories achievable in accordance with the techniques of one aspect of my invention.

Another common property of these apparently dissimilar motorized typewriters is the property of the roll-cam mechanism which will be called the "stroke normalizing effect" herein. This effect can be defined as the tendency of the great power capability of the drive roll to overcome other factors such as the inertial properties of the print mechanism and thus to cause the velocity of the print mechanism at the time when the highest point of the cam face leaves the surface of the drive roll to be substantially uniform from print mechanism to print mechanism and from stroke to stroke, despite lateness of engagement between the roll cam and the drive roll due to motion of the print mechanism persisting from the immediately previous print cycle. The stroke normalizing effect is manifested in the trajectory of optimum reprinting cycle (T/ORC) in the upper portion of the ascending arc of this trajectory which because of the stroke normalizing effect will be substantially invariant in a given make of motorized bar typewriter having a given cam contour, not only from print mechanism to print mechanism and from reprinting cycle to reprinting cycle, but also as between reprinting cycles and initial or independent printing cycles, which are herein represented by trajectories designated T/IC (FIG. 4).

The stroke normalizing effect, along with the ballistic properties of the print mechanism, also accounts for the substantial invariance of the descending arcs of all of the hammer flight trajectories in a given automatic typewriter, not only the descending arcs of the T/ORC curves but also the descending arcs of the T/IC curves. As indicated in FIG. 4, the phase of all of the hammer flight trajectories in a given automatic typewriter extending from the time of impact of the type head upon the platen to the time of first rebound at the head rest is called the fixed phase (FP) because of this substantial invariance.

Considering these two invariance properties, or trajectory arcs, together, it may be seen that a large portion of every hammer flight trajectory in any given roll-cam typewriter is fixed in contour and substantially invariant from print mechanism to print mechanism, from print cycle to print cycle, and from one type of print cycle to another (i.e., from a T/IC cycle to a T/ORC cycle). This being the case, it will also be evident that the initial portion of each hammer flight trajectory, which is not invariant, is of the greatest importance in determining the number, criticality, or even existence of the consistent reprinting rates or ranges which I have discovered.

As will be further demonstrated hereinafter, the nature of the T/ORC curve is the major factor in determining the nature and existence of the consistent reprinting rates because of the great difference between the initial variable phase of the T/ORC curves as a class and the initial variable phase of the T/IC curves as a class.

It is, of course, well known to those having ordinary skill in the art that certain adjustment means are incorporated in substantially all cam-roll typewriter mechanisms whereby variations of the hammer flight trajectories can be introduced in order to compensate for the differing area of the various types. It is because of these variations, among others, that the above noted invariances are said to be substantial only.

On first considering these marked differences between the T/IC curves as a class and the T/ORC curves as a class, it appeared to me that a simple theoretical analysis could easily be devised which would tend to demonstrate that the consistent reprinting rates which I had discovered could not exist. Moreover it was evident that the best use of my discovery could not be made until a provisional theory of operation was evolved which would account for the divergence between said theoretical analysis and the existence in fact of these consistent reprinting rates.

For these reasons I evolved the tentative theory of operation which I will now explain. It is to be understood, however, that my invention as claimed in the appended claims is not to be limited by interpretation in the light of this tentative theory of operation. Rather, this theory of operation is set out by way of full and complete disclosure, to apprise those skilled in the art of my best understanding of the nature and consequences of my said discovery, so that they may practice my various aspects of said invention to the best effect.

Going now to FIG. 4, it will be seen that this figure represents the flight trajectories described during several successive reprintings of the same character by an automatic bar typewriter in response to the reading by the reader of that typewriter of the same code at successive code locations on the input medium (e.g., perforated information tape), according to the best mode of operation which I could visualize at the time of making my said discovery, the means of carrying out this mode being not then at hand. In this figure the curve T/IC is an idealized representation of the type hammer flight trajectory during the print cycle in which the initial impression of the series of successive reprintings of the same character refered to above is made. This curve, and the reference symbol T/IC are also taken herein to represent the flight trajectory of a type hammer making an independent impression, i.e., an impresion which is not followed in the line of typewritten text by an impression of the same character, nor precedent by such an impression. The damping trajectory following the flight trajectory T/IC is not shown because FIGURE 4 represents a hoped-for mode of operation achieved in one embodiment of my present invention in which the flight trajectory coresponding to each impression commences with the rebounding of the type head from the head rest at the end of the previous flight trajectory. The curves T/ORC represent the flight trajectory of the *same* type hammer in *reprinting* the *same* character which was printed during the trajectory T/IC. (Certain words have been *underlined* in the previous sentence to emphasize that is repeated printing of the same character to which my present invention principally relates; the independent printing of isolated characters being relatively uncritical at the speeds which can be achieved in simple, fixed cycle automatic bar typewriters which employ my present invention but are otherwise unmodified.) Each curve T/ORC commences at the end point of the preceding flight trajectory curve in order to represent said hoped-for mode of operation.

As may be seen by inspection of FIG. 4, the reference symbol D/IC designates the duration of the initial character cycle whose trajectory is designated T/IC, while the reference symbol D/ORC designates the duration of the optimum reprinting cycles whose trajectory is designated T/ORC. The use of the term optimum in this connection will be explained hereinbelow.

The simple theoretical analysis referred to above is demonstrated in terms of FIG. 4 as follows. First, it was assumed for the purposes of said analysis that the ideal mode of operation represented in FIG. 4 (i.e., each flight trajectory commencing as the previous one ends) could be accomplished in fact, though it was not then known that this was the case. It was then graphically determined that this mode of operation could not be achieved at the fixed operating rate (reader rate) having D/IC as its period, since, as shown in the upper time scale of FIG. 4, each successive actuation of the print mechanism (at the end of each period D/IC) takes place at a later time in the corresponding flight trajectory T/ORC, indicating that successive flight trajectories T/ORC would tend to follow their predecessors at ever increasing intervals, rather than following each other immediately as shown.

By similar reasoning it was seen that the rate of operation corresponding to the period D/ORC would not result in the hoped-for mode of operation, since the corresponding actuation times (at the end of each period D/ORC) would occur too early. The effects of this early actuation was unpredictable but appeared likely to result in unsatisfactory reprinting, if any.

By similar analysis it appeared clear that no single, fixed rate existed at which the difference between the T/IC and T/ORC curves would not result in unsatisfactory operation.

Despite this analysis I was faced with the fact that my discovery could be demonstrated by way of satisfactory reprinting operation in the two kinds of automatic bar typewriter I have described above.

Thus, it followed that the premises on which said simple theoretical analysis was based would not hold, and that the simple, fixed cycle automatic bar typewriters in which my discovery was inherently embodied were self-regulating in the sense that when modified according to my invention their reprinting cycles varied in duration in such manner that each reprinting cycle ended at a time which made it possible for the next actuation of the print mechanism to bring about acceptable reprinting. I could at the same time see that a possible correlative of this self-regulating tendency existed in these devices as a tolerance for variation in the phase of the hammer flight trajectory at which reactuation takes place, said tolerance (sometimes called "reactuation time tolerance" herein) being greater than I had previously expected to exist.

The expression "reactuation time tolerance" as used herein includes both the type of reactuation in which a roll cam is tripped to initiate the reprint cycle (e.g., roll cam 50 of Buckley tripped by latch 56) and the type of reactuation in which a roll cam is pressed into contact with the drive roll by means other than a cam rotating spring, as in my Nova typewriter in which the reader operates the keys of a Model C IBM typewriter in which the key action presses the roll cam into contact with the drive roll.

Figures 3A, 3B, 3C, 3D, 5, 6:
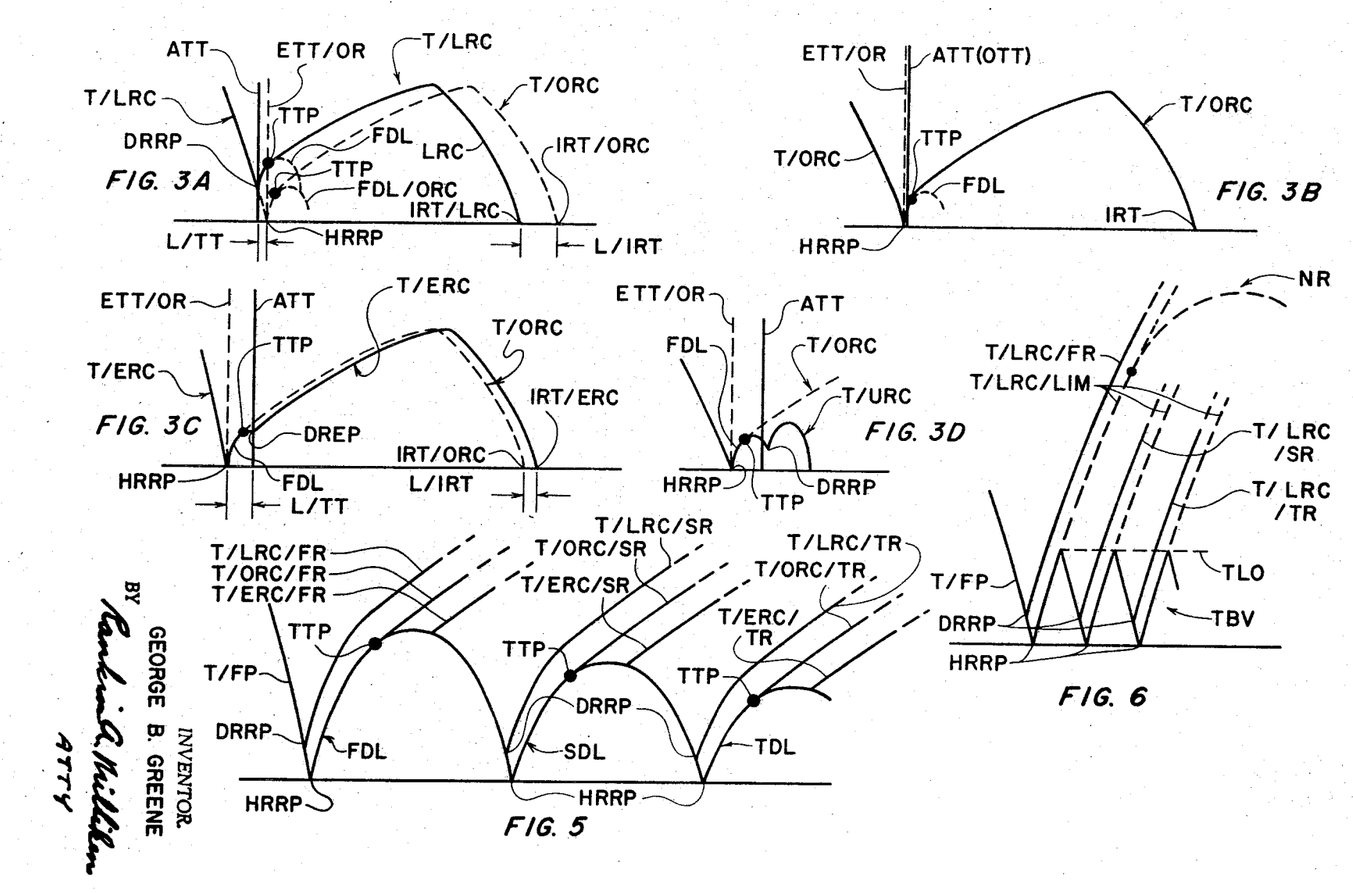
FIGS. 3A through 3D represent type heads in typical flight trajectories of an automatic typewriter immediately reprinting the same character at various advanced rates of operation.
FIG. 5 represents the interrelationship of certain modes of operation of one class of embodiments of my invention.
FIG. 6 represents the interrelationship of certain modes of operation of another class of embodiments of my invention.

Referring now to FIGS. 3A through 3D, it should first be noted that FIGS. 3A and 3C represent the two relatively transient types of reprinting cycle or modes of operation which I believe to account for the self-regulating tendency referred to above; FIG. 3B represents the relatively stable type of reprinting cycle or mode of operation which I believe to give rise to the reactuation time tolerance defined hereinabove; and FIG. 3D represents the type of reprinting cycle or mode of operation which I believe to correspond to the unreliable reprinting ranges referred to hereinabove.

The phenomenon or property of reactuation time tolerance may best be understood by making reference to FIGS. 3B and 4 jointly.

As illustrated in FIG. 4, an optimum zone (OZ) exists at the beginning of every optimum reprinting cycle (ORC). This zone OZ commences at the rebound point at which the curve T/ORC commences, the time corresponding to which point is sometimes designated "earliest trigger time for optimum reprinting," or ETT/OR, herein. This zone OZ extends from time ETT/OR to the time corresponding to the trajectory transition point (TTP) shown in FIG. 3B.

Any time within the optimum zone OZ is an optimum triggering time (OTT) at which the triggering of the print mechanism will cause the corresponding type bar to describe the trajectory T/ORC. In other words, the triggering of the print mechanism at time ETT/OR and the triggering of the print mechanism at the TTP time will result in the type head following substantially the same trajectory, T/ORC, as will triggering at any time therebetween.

Thus, as illustrated in FIG. 3B, the retriggering of a print mechanism at any actual triggering time ATT falling within the broad range defined by ETT/OR and TTP (i.e., within the zone OZ) will cause the then rebounding hammer of that print mechanism to be propelled along a trajectory of the T/ORC form, and thus to return to the head rest at the same initial rebound time IRT (of the succeeding cycle, if any) irrespective of the phase of the optimum zone OZ at which it is triggered, rather than following the path FDL, which it otherwise would do. (It is quite possible, of course, that the type head may not return to the head rest at a time IRT (e.g., when the typewriter is adjusted as shown in the middle time scale of FIG. 4 and described above in connection with said middle time scale).) It is also to be noted that while the partial trajectory shown at the left-hand side of FIG. 3B is designated T/ORC it is possible, for instance, that the trajectory preceding the T/ORC trajectory shown in full in FIG. 3B may be a T/IC trajectory, such a T/IC–T/ORC transition being shown, for example, in FIG. 4, or some other trajectory shown herein.

This substantial invariance of initial rebound time (IRT) may be thought of as resulting from the fact that triggering during the optimum zone OZ results in the cam being released for rotation (Buckley) or starting to rotate (Nova) at a time when the not yet fully damped condition of the print mechanism is causing the cam to recede from the drive roll, and the type head to rise from the head rest as shown by the rising arc of the first damping lobe FDL. As pointed out above, this circumstance will ultimately result in a match between the prevailing rebound velocity of the roll cam and the velocity which the rotation of the roll cam by the drive roll tends to impart at point TTP. Put differently, the zone OZ is that zone in which the rebounding roll cam is receding from the drive roll at a higher instantaneous velocity than the instantaneous velocity at which the roll cam axis would travel if the roll cam and the drive roll were fully engaged. In other words the roll and cam are in slipping or overriding engagement in the OZ zone.

At point TTP these velocities have equated at a common critical value and thereafter dynamic engagement takes place, the roll cam and drive roll are in torque transmitting engagement and the linear velocity of the cam axis is that which is determined by the cam contour (i.e., stroke normalization is taking place), until the time of disengagement.

Going now to FIG. 3A, the factors which I believe to produce the phenomenon which I call "late rebound correction" will now be described. It is to be particularly noted that this phenomenon is more pronounced in certain typewriters embodying my present invention, such as my Nova typewriter, and tends to exist to a less than optimum degree in typewriters employing the Buckley-type print mechanism, particularly those employing toggle type bar mechanisms.

The solid trajectory line extending from the left-hand edge of FIG. 3A represents the actual trajectory which will be described by a type bar which is retriggered at an actual trigger time ATT occurring before the descending type head has reached the head rest (HRRP). This actual trajectory is designated T/LRC herein, or trajectory of late rebound cycle. Perhaps the most significant feature of this T/LRC trajectory is its point DRRP, or drive roll rebound point.

The nature of the drive roll rebound point (DRRP) may be explained as follows. At drive roll rebound point DRRP (time ATT) the print mechanism is retriggered while the roll cam is approaching the drive roll after the printing impact but is at a greater than minimum distance from the drive roll, and thus the roll cam turns as it approaches the drive roll. As the roll cam turns it will, of course, present an ever greater radius to the drive roll. Making the simplifying assumption that the roll cam turns very rapidly as compared with the movement of its axis toward the drive roll, it follows that a point of its contour of greater than minimum radius will sharply strike the surface of the drive roll so shortly after the time ATT that the difference in time is now shown in a drawing on the scale of FIG. 3A. This sharp striking of the drive roll by a point on the contour of the roll cam will cause the entire print mechanism to rebound, whence the term "drive roll rebound point."

After the print mechanism has thus rebounded the roll cam will continue to turn, tending to remain in sliding contact with the drive roll while the type head follows the arc DRRP-TTP of the trajectory T/LRC. At the point TTP of the T/LRC curve the linear velocity of the roll cam has so decreased that the drive roll and roll cam become synchronously engaged and stroke normalizing commences. To a reasonable degree of approximation it can be assumed that due to normalization the T/LRC trajectory will closely resemble the T/ORC trajectory after point TTP, except for the fact that it will lead the equivalent T/ORC curve in time because its transition point TTP occurs earlier in time than the transition point TTP of the equivalent T/ORC curve (dashed). The amount by which the resulting initial rebound time of the late rebound curve (IRT/LRC) leads the initial rebound time of the equivalent T/ORC curve (IRT/ORC) is called "lead of initial rebound time" or L/IRT. By contrast, the interval by which the actual trigger time ATT leads the trigger time ETT/OR of the equivalent T/ORC curve, designated L/TT, is much shorter. As can be seen from FIG. 3A, this disparity between these two lead times results from the fact that the drive roll rebound described above not only occurred earlier than the equivalent head rest rebound, but effectively took place at a point further removed from the drive roll (DRRP as compared with HRRP).

Assuming that the typewriter from which the schematic diagram of FIG. 3A is derived is operating at a rate whose period is D/ORC, it may be seen that the actual trigger time which initiates the following print cycle will occur at an interval L/TT before the point IRT/ORC, and that thus the rebound point IRT/LRC will lead its corresponding actual trigger time by the interval L/IRT minus L/TT. Thus, the late rebound correction will have been so complete in one print cycle that the corresponding head rest rebound point (HRRP) will lead rather than lag the actual trigger time.

Referring now to FIG. 3C, the factors believed to be responsible for the existence of a tendency toward early rebound correction will be explained. By early rebound correction is meant a tendency to correct for head rest rebounding which takes place so early that the actual triggering of the roll cam does not occur until after the transition point TTP; that is, after the time corresponding to the zone OZ has passed.

Considering the actual trigger time ATT shown in FIG. 3C, it can be seen that a drive roll engagement point (DREP) corresponds thereto.

At this point DREP the roll cam axis has substantially zero instantaneous linear velocity. Making the simplifying assumption stated above, the roll cam will rotate sufficiently to contact the drive roll while this velocity is yet substantially zero. Thus the initial contact between the roll cam and the drive roll will tend to immediately result in full synchronous engagement for the same reasons that cam-roll contact when the print mechanism is in its quiescient state will result in such engagement. The forces produced by the tendency of the print mechanism to return toward the drive roll on what would have been the descending arc of the first damping lobe FDL will improve the engagement between the roll cam and the drive roll, thus stabilizing the abrupt transition at DREP, and forcing the print mechanism to then follow trajectory T/ERC, which because of said invariant properties is very similar to the equivalent T/ORC curve (dashed), but lags behind it by an interval L/IRT at the initial rebound time IRT/ERC.

Going now to FIG. 3D, it is believed that the reason for the existence of unreliable reprinting rates may be understood. Assuming that triggering of the roll cam takes place at an actual trigger time ATT at which the rebounding print mechanism has passed its peak and returned a substantial distance, say, half-way, toward its quiescent position, the point on the cam contour which strikes the drive roll will be located a considerable distance along the cam contour from the initial point of minimum radius. It will also be true, however, that the rate at which the cam approaches the drive roll due to the motion of the print mechanism will be very great at this time, resulting in a violent, high energy rebound of the print mechanism from the drive roll. This condition of violet rebound from the drive roll will probably result in a very distorted trajectory of the print mechanism, bringing about unreliable printing, if any at all. Indeed, it may well be, as generally indicated in FIG. 3D, that this violent rebound may not be sufficient to bring about any print trajectory at all, since upon return from this rebound the cam may have rotated so fast that its highest point completely escapes the drive roll, causing the cam trajectory to take some completely ineffective shape generally suggested as T/URC (trajectory of unreliable reprint cycle) in FIG. 3D, and resulting in no impression whatever.

Referring now to FIG. 5, and using the system of reference characters employed in connection with FIGS. 3A through 3D and 4, it may be seen that in a plain or free bar typewriter characterized by free damping lobes DL such as those shown in the S-ranges in FIG. 2A a family of trajectories corresponding to the trajectories described above in connection with FIGS. 3A through 3D can be expected to arise from each one of at least the first few damping lobes DL. To each such family of trajectories there will correspond a mode of typewrier operation which consists in operating a type writer embodying my invention at a reader rate such that on reoperation its type bars will describe one of the types of trajectories discussed above in connection with FIGS. 3A through 3D, and will tend to operate within the OZ zone in which its type bars when reoperated will describe T/ORC trajectories as shown in FIG. 3B. I call the mode of operation associated with the first damping lobe (FDL) the primary free bar mode, the mode associated with the second damping lobe (SDL) the secondary free bar mode, etc. Thus, when a typewriter embodying my invention is operated in the secondary free bar mode it will be operated at a reader rate whose period is D/ORC/SR, or a rate close to it, and its type bars will tend to follow trajectories of the form T/ORC/SR corresponding to print mechanism triggering within the zone OZ/SR. If the reader rate is different from the rate corresponding to D/ORC/SR, within fairly broad limits, the reoperating hammers will sometimes follow a T/LRC/SR or T/ERC/SR trajectory, but, as explained hereinabove, will tend to describe T/ORC-type trajectories T/ORC/SR after one or two reprint cycles.

While it will be clear to those having ordinary skill in the art that operation in the primary free bar mode provides the highest possible speed in plain bar automatic typewriters embodying my invention which have fixed print cycles, there may well be some situations in which operation in the secondary or lower free bar speed modes involves less critical adjustment of the typewriter, or has some other clear advantage the gaining of which is paramount over the desideratum of highest operating speed. Thus, it is to be specifically understood that my invention its not limited to the primary free bar mode of reoperation as defined hereinabove.

Referring now to FIG. 6, which is an idealized representation of the operating characerisics of toggle type bars in automatic bar typewriters embodying my invention, it may be seen that such type bars do not necessarily follow even the first lobe of the free type bar damping curve as shown in FIGS. 2A and 5. Rather, the toggle (20, 21 of FIG. 1), when correctly adjusted according to the teachings of the prior art, will prevent even the first full rebound of the type bar from the head rest. That is, a plain type bar will initially rebound, say, to the position corresponding to the peak of the first damping lobe FDL in FIG. 5, and after a second impact with the head rest will rebound to the peak of the second damping lobe SDL in FIG. 5. A toggle type bar (FIG. 1), to the contrary, will be "locked out" by the toggle 20, 21, FIG. 1, and will rebound only to the limited extent represented by the dashed line TLO in FIG. 6. Since essentially the same amount of energy must be dissipated as in the plain type bar, however, the toggle type bar will continue for some time to rebound to dashed line TLO in FIG. 6. Thus, the settling characteristic of such a type bar will resemble the curve generally designated TBV in FIG. 6. It is, of course, to be understood that all of the curves shown in FIGS. 2A through 6 are idealized representations, and that the actual curves derived from high-speed photographs or other means will not necessarily closely resemble the curves shown in these figures. This caveat applies with special force to the toggle type bar settling curve TBV of FIG. 6. The actual toggle type bar operation disclosed by high speed movies will often show vibrations so complex or erratic as to not admit of representation in a single diagram, if it admits of simple graphic representation at all.

For this reason it appeared somewhat doubtful that my invention would be applicable to automatic typewriters having toggle type bar print mechanisms. Such a limitation of my invention would have been a major one indeed, since the most widely available automatic bar typewriter, the Flexowriter, at that time had toggle type bars. It was also evident that if my theory of the operation of my invention was reasonably valid then a toggle type bar machine operating in accordance with my invention would be very likely to have but one mode of operation giving reasonably high print quality, which I designated the toggle mode. On the basis of my discovery and theory of operation I predicted that the toggle mode of reoperation would be fairly critical in that it would probably require that the correct speed of reader operation be held quite closely.

Because of the potential economic importance of being able to apply my invention successfully to toggle bar automatic typewriters with substantially fixed print cycles, such as that sold under the trademark Flexowriter, I undertook a supplementary program to resolve this question. This program proved that it is possible to successfully utilize my invention in a Flexowriter automatic bar typewriter having toggle type bars. It also showed, however, that the toggle mode of consistent reoperation is more critical than the free bar modes of consistent reoperation, requiring more adjustments of the type commonly made during typewriter assembly and initial installation in the office of the customer, to assure continuing correct operation. This greater criticality is believed to result from the fact that the roll cams usually used in toggle bar typewriters are very shallow, i.e., have very little rise, as compared with those used in the free bar typewriter on which my Nova automatic typewriter was based. Due to this shallowness, and other design factors, these prior art toggle bar typewriter cams are not necessarily constrained to remain in slipping or overriding engagement with their associated drive rolls during immediate reprinting, as described hereinabove in connection with the definition of the optimum zone OZ, but rather may skip along the surface of the drive roll, repeatedly contacting the drive roll and rebounding therefrom before finally engaging the drive roll. As a result of this supplementary program it can be said that there exists a reader speed or speed range at which the Flexowriter automatic bar typewriter may be modified to exhibit a consistent reprint quality range as defined herein, though this range is more critical and requires more of the type of adjustment commonly made by those having ordinary skill in the automatic typewriter art to assure that such consistent reoperation will be stable.

It will now be appreciated by those having ordinary skill in the art that my invention may be applied to commercially available automatic bar typewriters, or motorized bar typewriters to which automatic control means such as the fluidic control system of my '297 patent have been added, by simple and inexpensive modifications the making of which are within the scope of one having ordinary skill in the art, without the exercise of invention.

For example, the automatic typewriter of the above-cited Buckley patent may be modified to embody my present invention by replacement of the worm and pinion which drive its translator and reader with a worm and pinion of suitable ratio, or the equivalent. This worm and pinion are designated 36 and 37 in FIG. 1. By "suitable ratio" is meant, of course, that gear ratio or worm-to-pinion ratio which will change the speed of the reader 10 and translator 11 to the speed at which consistent high print quality reoperation of all of the print mechanisms of the typewriter takes place. (This statement assumes, of course, that the dynamic properties of the various parts of the Buckley typewriter are such as to permit correct operation at consistent high print quality reoperation speeds, which is believed to be the case because of the close relationship of the Buckley typewriter to the Flexowriter automatic bar typewriter, a specimen of which I have successfully so modified.) (It is recognized, however, that some automatic bar typewriters may not be dynamically suitable for direct and simple modification to embody the present invention, but may first require certain dynamic improvements within the scope of those having ordinary skill in the art which are related to the characteristics of the typewriter itself, and not to the present invention.)

It is to be preferred, according to my present invention, that the rebound limiting property of the toggle type bars of the Buckley typewriter (and of the Flexowriter automatic bar typewriter) be at least partially defeated, or that the toggle type bars be replaced with free or plain type bars. In both of these preferred embodiments there may be several of said suitable worm-to-pinion ratios or the equivalent, while in the Buckley typewriter having the original toggle type bar arrangement there may be but one such suitable ratio. Whether the original toggle type bars of Buckley are retained, replaced, or their rebound inhibiting property at least partially defeated, however, the suitable worm-to-pinion ratios for driving the reader and translator at consistent print quality reoperation rates may be determined by one having ordinary skill in the automatic bar typewriter art as follows.

First, pinion 37 may be removed from the shaft of cam 47 and an extension added to the shaft of cam 47 extending to the right of the typewriter shown in FIG. 7, for reasons which will be stated below.

Second, pinion 37 may be affixed to a shaft journalled in bearings mounted at the right-hand side of the typewriter for that purpose, and so located that pinion 37 meshes with worm 36 from above.

Third, said extension of the shaft of cam 47 and the shaft on which pinion 37 is now mounted may now be suitably coupled to the output and input shafts, respectively, of a positive, infinitely variable speed transmission, thus making it possible to vary the speed of the reader and translator over a wide range without altering the speed of drive roll 15, and the manual control of the transmission then set to the position at which the ratio of translator and reader speed to drive roll speed is the same as it was when worm 36 and pinion 37 were in direct engagement.

Fourth, a loop of test tape may be prepared in the manner well-known to those having ordinary skill in the art under the control of which the typewriter will be caused to repeatedly print certain characters whose type bars are located in different parts of the type basket. For instance, such a test tape may be prepared to typewrite "qqqqqqqqqq bbbbbbbbbb pppppppppp" and then stop typewriting until the start key is actuated.

Fifth, by alternately advancing the setting of the manual control of the transmission and actuating the start key of the typewriter the reader and translator speed may be increased in increments and the quality of immediately repeated printing of the same character determined after each such incremental increase in speed. As the reader and translator speed is thus raised it will be found that the quality of immediately repeated impressions of the same character becomes unacceptable poor (some of such repeated impressions sometimes not being made at all) at some rates or ranges of reader and translator speed which I have designated "unreliable rates" or "unreliable ranges" herein. By further raising the reader and translator speed, however, one or more consistent print quality rates or ranges may be found at which all of the repetitions of the character codes q, b, and p on the test tape produce typewritten impressions, and the quality of all the immediately repeated impressions is substantially equal to the quality of the first impression of each series.

Sixth, a more extensive test tape may then be prepared to assure that all of the type bars reoperate with consistent print quality.

Seventh, the transmission input speed to output speed ratios (or transmission ratios) corresponding to said consistent print quality rates or ranges may be determined by reading the indicator with which the transmission is equipped.

Eighth, the corresponding worm-to-pinion ratios for the transmission replacement worm and pinion sets may then be determined from the reading of the transmission indicator and the nature of the couplings from and to the typewriter by methods known to those having ordinary skill in the art.

Ninth, the said shaft extension, the relocated pinion 37, and worm 36, may then be removed, and one of said replacement worm and pinion sets installed in their stead.

Tenth, the typewriter may be readjusted, following the procedures by which it was initially adjusted at its original lower speed at the time of assembly.

It will be apparent to those having ordinary skill in the art that the above procedure will probably have to be followed only once for each model of automatic bar typewriter which is to be modified to embody my invention. For example, the above procedure probably need be followed only once for the Buckley patent typewriter with its original toggle type bars, once for the Buckley patent typewriter employing my free bar simulator invention, and once for the Buckley patent typewriter in which plain type bars are substituted for the original type bars. When once a proper worm-to-pinion ratio is thus established for a given model of automatic bar typewriter, it is very probable that the further necessary adjustments such as are made in the assembly of all automatic typewriters can be made without changing the gear ratio determined by this procedure.

It is assumed that in the above described determinations and adjustments the drive roll speed is unvaried.

While a procedure for determining suitable worm-to-pinion ratios for the Buckley patent typewriter, and certain modifications thereof has been described, the application of the same general procedure to other automatic bar typewriters will now be apparent to those having ordinary skill in the art.

It will thus be seen that the objects set forth above, among those made apparent from the preceding description, are efficiently attained, and, since certain changes may be made in the above constructions without departing from the scope of my invention, it is intended that all matter contained in the above description or shown in the accompanying drawings shall be interpreted as illustrative only, and not in a limiting sense.

It is particularly noted that although my invention has been disclosed as embodied in automatic bar typewriters which are equipped for transcribing text from perforated tape, my invention is equally applicable to automatic bar typewriters which are equipped to be operated by magnetic tape, or by electrical or other signals transmitted from remote locations, including signals transmitted from similar typewriters, and signals transmitted from digital computers, punch-card operated devices, and the like. Further, my invention is not limited in its application to devices having manually operable keyboards. Furthermore, my invention is equally applicable to typewriters used in systems comprising one or more of the following devices: tape perforators or other input data preparing means, tape readers or other input data reading means, solenoid-coupled mechanical calculators, small-scale digital computers, electrostatic, magnetic, or acoustic memory devices, and the like.

It is also to be understood that the following claims are intended to cover all of the generic and specific features of my invention herein described, and all statements of the scope of my invention which as a matter of language, might be said to fall therebetween.

Having described my invention, what I claim as new and desire to secure by Letters Patent is:

1. An automatic bar typewriter, comprising:
head rest means;
a plurality of type bars;
smooth-surfaced drive roll means;
motive means for rotating said drive roll means;
lever means including
    first lever means, each of said first lever means being linked to one of said type bars and
    second lever means for driving corresponding ones of said first lever means and their associated type bars to cause a type impression when rocked in a first direction;
drive roll engaging means for providing power to rock corresponding ones of said second lever means in said first direction when engaged with said drive roll means;
biasing means for reversing the motion of said second lever means after they have been rocked by said drive roll engaging means and before their corresponding first lever means and type bars commence to return to their rest positions;
type bar rebound limiting means, said type bars upon returning to said head rest executing a plurality of excursions between said head rest and a limit set by said rebound limiting means, said excursions decaying to an amount of travel less than said limit set by said rebound limiting means unless the vibrating type bar is immediately reactuated to make a second unspaced impression of the same symbol;
control means for causing successively selected ones of said drive roll engaging means to engage said drive roll means in accordance with serially occurring symbol-representing signals; and
drive means for driving said control means at a rate of operation at least great enough so that when making two unspaced impressions of the same symbol at least some of said type bars are redriven to make the second impression while yet executing excursions between said head rest and said limit set by said rebound limiting means.

2. An automatic bar typewriter, comprising:
head rest means;
a plurality of type bars;
smooth-surfaced drive roll means;
motive means for rotating said drive roll means;
lever means including
    first lever means, each of said first lever means being linked to one of said type bars, and
    second lever means for driving corresponding ones of said first lever means and their associated type bars to cause a type impression when rocked in a first direction;
drive roll engaging means for providing power to rock corresponding ones of said second lever means in said first direction when engaged with said drive roll means;
biasing means for reversing the motion of said second lever means after they have been rocked by said drive roll engaging means and before their corresponding first lever means and type bars commence to return to their rest positions;
type bar rebound limiting means, said type bars upon returning to said head rest executing a plurality of excursions between said head rest and a limit set by said rebound limiting means, said excursions decaying to an amount of travel less than said limit set by said rebound limiting means unless the vibrating type bar is immediately reactuated to make a second upspaced impression of the same symbol;
control means for causing successively selected ones of said drive roll engaging means to engage said drive roll means in accordance with serially occurring symbol-representing signals; and drive means for driving said control means at a rate of operation at least great enough so that when making two unspaced impressions of the same symbol with their associated type bar rebound limiting means rendered incapable of limiting the extent to which they rebound at least some of said type bars would be redriven to make the second impression while yet executing excursions from said head rest greater than those which would be permitted by said rebound limiting means due to remanent energy imparted during the print cycle in which the first impression was made.

3. An automatic bar typewriter, comprising:
a head rest;
a power driven type bar actuating mechanism including a smooth-surfaced drive roll and a plurality of type bars supported for pivotal motion between type impression and rest positions,
a plurality of pairs of actuating bell cranks and drive bell cranks,
means for providing driving engagement between each said drive bell crank and the pair-associated actuating bell crank,
means mechanically coupling each said actuating bell crank and an individual one of said type bars for spring bias positioning of said individual type bar in said rest position thereof and for actuating-bell-crank drive of said individual type bar to said type impression position thereof,
power actuating means cooperating with said smooth-surfaced drive roll for driving said each drive bell crank through a drive half cycle of a reciprocal angular cycle of motion to drive the associated one of said actuating bell cranks through the major portion of a driven half cycle of its reciprocal angular movement and for reversing the motion of said each drive bell crank prior to and independently of the reversal of the motion of the associated actuating bell crank and its associated type bar;
type bar rebound limiting means, said type bars upon returning to said head rest executing a plurality of excursions between said head rest and a limit set by said rebound limiting means, said excursions decaying to an amount of travel less than said limit set by said rebound limiting means unless the vibrating type bar is immediately reactuated to make a second unspaced impression of the same symbol;
control means for causing said actuating mechanism to successively drive the ones of said type bars corresponding to serially occurring symbol-representing signals; and
drive means for driving said control means at a rate of operation at least great enough so that when making two unspaced impressions of the same symbol at least some of said type bars are redriven to make the second impression while yet executing excursions between said head rest and said limit set by said rebound limiting means.

4. An automatic bar typewriter, comprising:
a head rest;
a power driven type bar actuating mechanism including a smooth-surfaced drive roll and a plurality of type bars supported for pivotal motion between type impression and rest positions,
a plurality of pairs of actuating bell cranks and drive bell cranks,
means for providing driving engagement between each said drive bell crank and the pair-associated actuating bell crank,
means mechanically coupling each said actuating bell crank and an individual one of said type bars for spring bias positioning of said individual type bar in said rest position thereof and for actuating-bell-crank drive of said individual type bar to said type impression position thereof,
power actuating means cooperating with said smooth-surfaced drive roll for driving said each drive bell crank through a drive half cycle of a reciprocal angular cycle of motion to drive the associated one of said actuating bell cranks through the major portion of a driven half cycle of its reciprocal angular movement and for reversing the motion of said each drive bell crank prior to and independently of the reversal of the motion of the associated actuating bell crank and its associated type bar;
type bar rebound limiting means, said type bars upon returning to said head rest executing a plurality of excursions between said head rest and a limit set by said rebound imiting means, said excursion decaying to an amount of travel less than said limit set by said rebound limiting means, said excursion decaying bar is immediately reactuated to make a second unspaced impression of the same symbol;
control means for causing said actuating mechanism to successively drive the ones of said type bars corresponding to serially occurring symbol-representing signals; and
drive means for driving said control means at a rate of operation at least great enough so that when making two unspaced impressions of the same symbol with their associated type bar rebound limiting means rendered incapable of limiting the extent to which they rebound at least some of said type bars would be redriven to make the second impression while yet executing excursions from said head rest greater than those which would be permitted by said rebound limiting means due to remanent energy imparted during the print cycle in which the first impression was made.

5. In an automatic typewriter, a plurality of type bars, head rest means, drive means including roll cam means for driving each type bar, and control means for actuating said drive means to drive their corresponding type bars in accordance with serially occurring signals representing items of input information, said drive means being actuated at a predetermined rate during immediate reprinting by the same type bar, said predetermined rate being greater than a lower rate at which successive impressions made by the same type bar are obviously inferior in print quality to successive impressions made by the same type bar at said predetermined rate.

6. In an automatic typewriter, a plurality of type bars, drive means including roll cam means for driving each type bar, and control means for actuating said drive means to drive their corresponding type bars in accordance with serially occurring signals representing items of input information, said drive means being actuated during immediate reprinting of the same character at a consistent reprinting rate at which each of said items of input information produces a corresponding type impression, said consistent reprinting rate being greater than an unreliable repinting rate at which some of said items of input information fail to produce corresponding type impressions, said unreliable reprinting rate being greater than a reliable reprinting rate at which none of said items of input information fails to produce a corresponding type impression.

7. An automatic bar typewriter, comprising: head rest means; type bars; drive means including roll cam means for driving each type bar; and control means for successively actuating individual ones of said drive means to drive their corresponding type bars in accordance with serially occurring signals representing items of input in-formation; said type bars being so constructed and arranged as to rebound from said head rest means a plurality of times before fully damping, said drive means being actuated at such a rate during reprintings by the same type bar that said drive means consistently begin to redrive the same type bar after the Mth rebound of its type head from said head rest means and before its type head is able to rebound from said head rest means for the Nth time, M and N being successive integers, and occurring among the earlier ones of said plurality of rebounds.

8. An automatic bar typewriter, comprising: head rest means; a plurality of type bar assemblies, each of said type bar assemblies including type bar rebound limiting means; drive roll means; motive means for rotating said drive roll means; drive means for each of said type bar assemblies, each of said drive means including roll cam means and cam rotating means for rotating said roll cam means into contact with said drive roll means; and control means for successively actuating selected ones of said cam rotating means and thus causing the corresponding ones of said drive means to successively drive their correponding type bar assemblies in accordance with serially occurring signals representing items of input information; said type bars upon returning to said head rest means executing a plurality of excursions between said head rest means and a limit set by said rebound limiting means, said excursions decaying to an amount of travel less than said limit set by said rebound limiting means unless said type bar is immediately reactuated, the rate of actuating said cam rotating means during immediate reprinting of the same character being such that the type bar executes said excursions between said head rest means and said limit set by said rebound limiting means until its associated roll cam means is retriggered and commences to rotate.

9. An automatic bar typewriter, comprising: head rest means; a plurality of toggle type bars; drive roll means; motive means for rotating said drive roll means; drive means for each type bar, each of said drive means including roll cam means and cam rotating means for rotating said roll cam means into contact with said drive roll means; and control means for successively actuating selected ones of said cam rotating means and thus causing the corresponding ones of said drive means to successively drive their corresponding type bars in accordance with serially occurring signals representing items of input information; said type bars upon returning to said head rest means executing a plurality of excursions between said head rest means and a limit set by toggle locking action, said excursions decaying to an amount of travel less than said limit set by toggle locking action unless said type bar is immediately reactuated; the rate of actuating said cam rotating means during immediate reprinting of the same character being such that the type bar executes said excursions between said head rest means and said limit set by toggle locking action until substantially continuous contact between said drive roll means and said roll cam means recommences.

10. An automatic bar typewriter, comprising: head rest means; a plurality of type bars; drive roll means; motive means for rotating said drive roll means; drive means for each type bar, each of said drive means including roll cam means and cam rotating means for rotating said roll cam means to contact said drive roll means, said drive means being so constructed and arranged that said roll cam means is capable of contacting said drive roll means over substantially the entire rebound range of said type bars; and control means for successively actuating selected ones of said cam rotating means and thus causing the corresponding ones of said drive means to successively drive their corresponding type bars in accordance with searially occurring signals representing items of input information; the rate of actuating said cam rotating means during immediate reprinting of the same character being such that the type bar is redriven while yet retaining a sufficient part of the energy imparted to it by said drive means during the previous print cycle so that said roll cam means is capable of reengaging said drive roll means in overriding relationship during each excursion of its corresponding type bar from said head rest means.

11. An automatic bar typewriter, comprising: head rest means; a plurality of type bars; drive roll means; motive means for rotating said drive roll means; drive means for each type bar, each of said drive means including roll cam means and cam rotating means for rotating said roll cam means; and control means for successively actuating selected ones of said cam rotating means and thus causing the corresponding ones of said drive means to successively drive their corresponding type bars in accordance with serially occurring signals representing items of input information; the rate of actuating said cam rotating means during immediate reprinting of the same character being such that the type bar is redriven while yet retaining a sufficient part of the energy imparted to it by said drive means during the previous print cycle so that said roll cam means is capable of reengaging said drive roll means in overriding relationship during each excursion of its corresponding type bar from said head rest means.

12. An automatic bar typewriter, comprising: a plurality of type bars; drive roll means; motive means for rotating said drive roll means; drive means for each type bar, each of said drive means including roll cam means and cam rotating means for rotating said roll cam means; and control means for successively actuating selected ones of said cam rotating means and thus causing the corresponding ones of said drive means to successively drive their corresponding type bars in accordance with serially occurring signals representing items of input information; said drive means being so constructed and arranged that during successive printing of different characters the minimum distance between the axis of said drive roll means and the axis of said roll cam means is limited by stop means, said minimum distance being such that said cam is not in engagement with said drive roll; the rate of actuating said cam rotating means during at least some immediate reprintings of the same character being such that the minimum distance between the axis of said drive roll means and the axis of said roll cam means is not limited by said stop means, but is limited by contact between said drive roll means and said roll cam means, the point of initial contact between said roll cam means and said drive roll means during immediate reprinting of a character taking place at a point of the cam face having greater radius than that at which said roll cam means initially contacts said drive roll means to initiate printing actions other than immediate reprinting actions.

13. An automatic bar typewriter, comprising: head rest means; a plurality of type bars; drive roll means; motive means for rotating said drive roll means; drive means for each type bar, each of said drive means including roll cam means and cam rotating means for rotating said roll cam means into contact with said drive roll means; control means for successively actuating selected ones of said cam rotating means and thus causing the corresponding ones of said drive means to successively drive their corresponding type bars in accordance with serially occurring signal representing items of input information; and intermediate means associated with each of said type bars for coupling the type bar to its associated drive means during the driving of the type bar toward printing impact, and for decoupling the type bar from its associated drive means during at least part of the return stroke of the type bar from its point of printing impact to said head rest means; said drive means being so constructed and arranged that during successive printing of different characters said cam rotating means are so actuated that said roll cam means engage said drive roll without rebounding, said drive means being additionally so constructed and arranged that during the immediate reprinting of a series of the same character at least some of said cam rotating means are actuated at such a rate that said roll cam means engage said drive roll without rebounding for the first actuation of said series and that said roll cam means engage said drive roll and rebound more than once for the second and all subsequent actuations of said series.

(References on following page)

References Cited

UNITED STATES PATENTS

| | | | |
|---|---|---|---|
| 1,789,661 | 1/1931 | Schulze | 197—17 |
| 1,851,311 | 3/1932 | Hokanson | 197—17 |
| 2,247,275 | 6/1941 | Buckley | 197—20 |
| 2,448,842 | 9/1948 | Tholstrup | 197—20 |
| 2,600,200 | 6/1952 | Brink | 197—17 |
| 2,873,837 | 2/1959 | Clark | 197—20 |
| 2,995,231 | 8/1961 | Von Kummer et al. | 197—20 |
| 3,106,337 | 10/1963 | Bernard | 234—23 |
| 3,259,223 | 7/1966 | Heidt et al. | 197—17 |
| 3,340,987 | 9/1967 | Bastian | 197—20 |
| 3,342,296 | 9/1967 | Greene | 197—20 |
| 3,355,000 | 11/1967 | Blodgett | 197—17 |

EDGAR S. BURR, Primary Examiner

U.S. Cl. X.R.

197—17